UNITED STATES PATENT OFFICE.

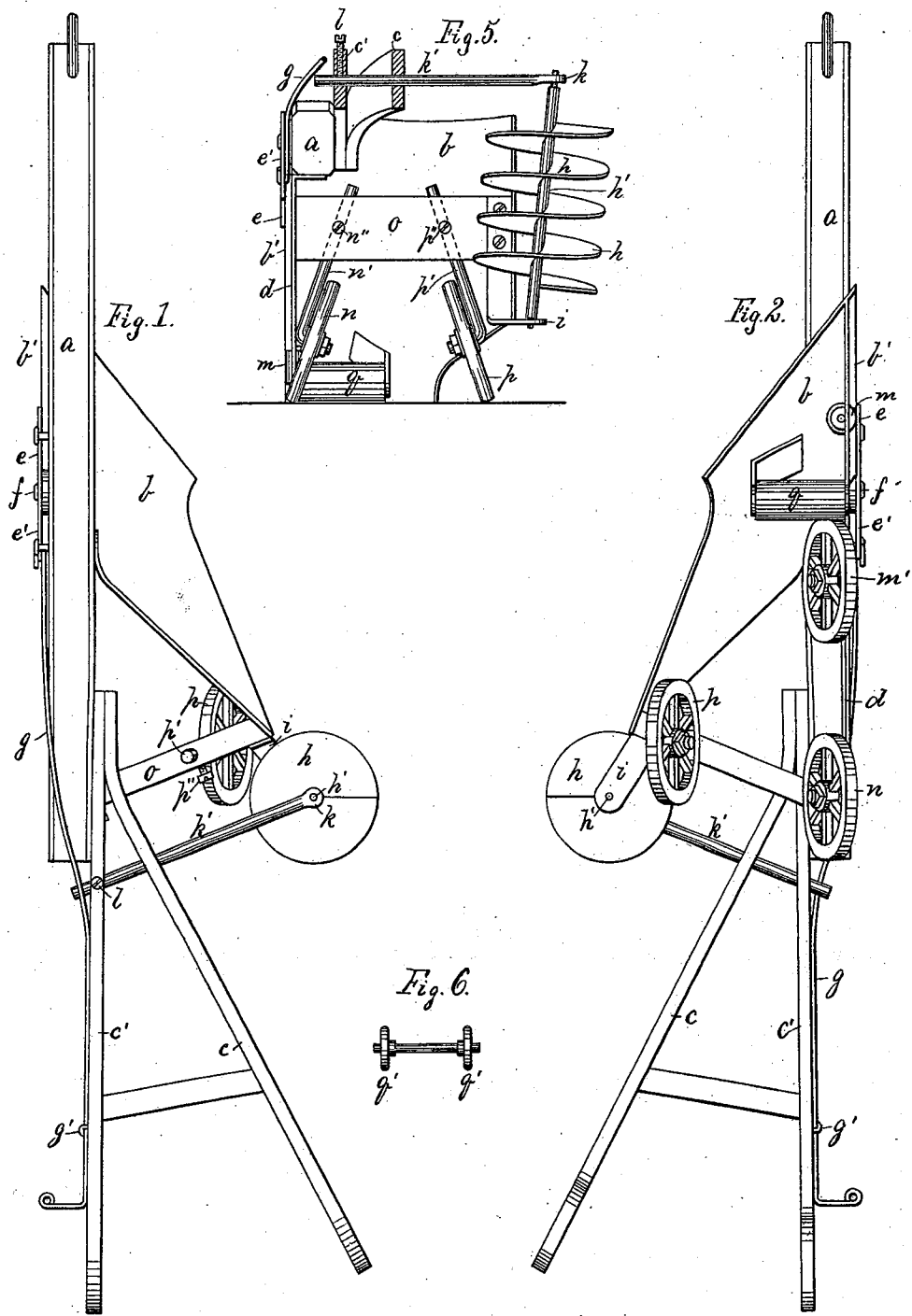

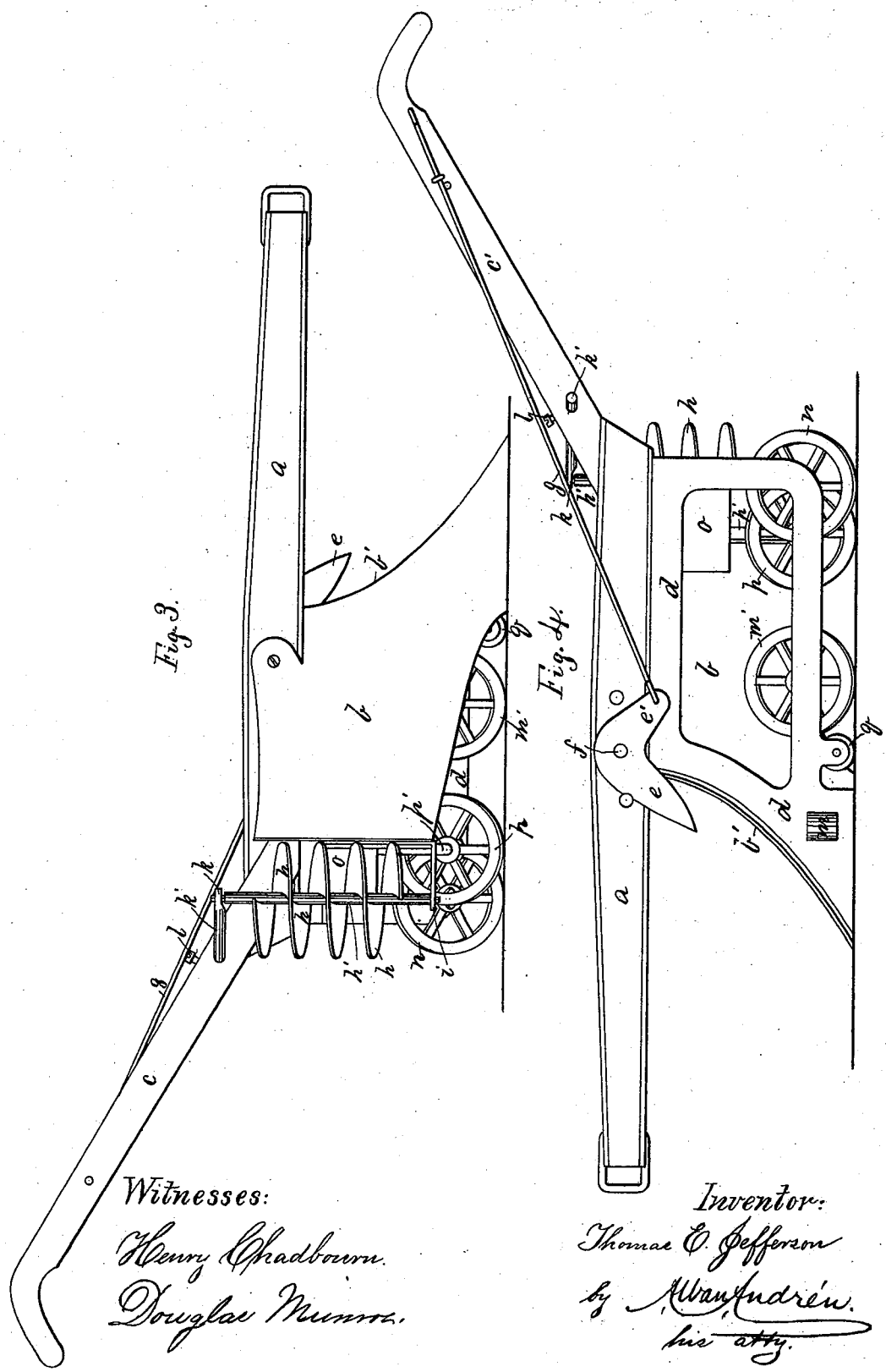

THOMAS E. JEFFERSON, OF BOSTON, MASSACHUSETTS.

IMPROVEMENT IN PLOWS.

Specification forming part of Letters Patent No. 210,202, dated November 26, 1878; application filed October 16, 1878.

*To all whom it may concern:*

Be it known that I, THOMAS E. JEFFERSON, of Boston, in the county of Suffolk and State of Massachusetts, have invented certain new and useful Improvements in Plows; and I do hereby declare that the following is a full, clear, and exact description of the invention, which will enable others skilled in the art to which it appertains to make and use the same, reference being had to the accompanying drawings, and to letters of reference marked thereon, which form part of this specification.

My invention consists of a loosely-revolving screw or spiral located in bearings at the rear of the mold-board for the purpose of automatically inverting, pulverizing, and laying over the soil without much friction, which screw or spiral is made adjustable out or in from the center line of the plow, according to the width of the furrow that is to be made or the amount of soil that is to be turned over. I prefer, in using said screw or spiral, to shorten the mold-board at the rear, so as to let the rotary spiral take the place of the rear end of said mold-board.

My invention further relates to the employment of a horizontal roller or a pair of small wheels on the under side of the plow, near the front end of the plowshare, for the purpose of sustaining the forward end of the plow in its progress over the ground without much friction.

My invention further consists in the combination, with a plow, of a pair of rear oblique wheels, a lower roller or a pair of wheels on the under side of the forward end of the plowshare, and a vertical loosely-revolving roller located in bearings on the forward end of the land-side of the plow, or a forward obliquely-set rotary wheel located in the forward part of the land-side, for the purpose of supporting the plow in either a vertical, horizontal, or oblique direction during its progress through the soil with a minimum of frictional resistance.

On the accompanying drawings, Figure 1 represents a plan view of my invention. Fig. 2 represents a bottom view of the same. Fig. 3 represents a side elevation, seen from the mold-board side. Fig. 4 represents a side elevation, showing the opposite part of Fig. 3. Fig. 5 represents a rear view, and Fig. 6 represents a modification, of the horizontal friction-roll under the forward end of the plow.

Similar letters refer to similar parts wherever they occur on the different parts of the drawings.

$a$ represents the beam of the plow; $b$, its mold-board; $c$ $c'$, the arms or stilts, and $d$ the land-side frame. $e$ is a shear or cutting device, hinged at $f$ to the beam $a$, and made to operate against the forward sharp edge $b'$ of the mold-board, as and for the purpose de scribed.

The knife or shear $e$ is extended toward the rear as a bent arm or lever, $e'$, that is jointed to the rod $g$, supported loosely in bearings $g'$ $g'$, and extending on one side of the arm $c$ to its upper end, so as to be conveniently within reach for the operator when it is desired to reciprocate the cutting device.

$h$ is the spiral or screw, attached to its shaft $h'$, that is supported loosely in the bearings $i$ and $k$ at the rear of the mold-board $b$, as and for the purpose set forth. The upper bearing, $k$, is made adjustable in and out toward the middle of the plow, extending for this purpose as a bar, $k'$, that passes through holes in the arms $c$ $c'$, as shown, and secured in place by means of the set-screw $l$, or similar well-known devices.

$m$ is an anti-frictional roller, located up and down in bearings on the land-side of the plow, very near to its forward end or point, for the purpose set forth.

$m'$ is an oblique wheel, the lower edge of which is intended to run in the corner of the furrow that is plowed, so as to guide the plow and support it without much friction, both in a vertical and lateral direction.

$n$ is a similar oblique wheel, supported in the adjustable bearing or frame $n'$, and secured, when adjusted by means of the set-screw $n''$, to the brace or frame $o$, or other stationary part of the plow. The lower edge of this wheel $n$ is so arranged as to project into the corner of the furrow made by the plow in a similar manner to the oblique wheel $m$.

$p$ is still another oblique wheel on the mold-board side of the plow, which wheel inclines from its lower part toward the beam of the plow, as and for the purpose set forth. The wheel $p$ is also adjustable up and down, being for this purpose supported in the adjustable bearing or frame $p'$, and secured, when adjusted by means of the set-screw $p''$, to the brace or frame $o$, as shown.

$q$ is a horizontal anti-frictional roller, located in bearings in the base of the plow, near its forward end, for the purpose of supporting that part of the plow and allowing it to move forward on the soil without much friction, as set forth. A modification of this roller is shown in Fig. 6, in which it is shown as being made as two wheels, $q'$ $q'$, each of which is free to move independently of the other on their common axle, by which the plow can be turned to right or left with a minimum of frictional resistance. The roller $q$ is preferable on soft lands, and the modification shown in Fig. 6 is of advantage when plowing in hard soil.

Having thus fully described the nature, construction, and operation of my invention, I wish to secure by Letters Patent and claim—

1. In a plow, a loosely-rotating screw or spiral, $h$, located at the rear end of the moldboard $b$, substantially as and for the purpose set forth and described.

2. In a plow, the forward horizontal roller, $q$, or a pair of wheels arranged beneath the forward end of the plow, for the purpose of sustaining the entire weight of such forward end without much friction, substantially as set forth.

3. The combination of the rear oblique wheels $n$ $p$, the lower horizontal forward roller or wheels $q$ $q'$ $q'$ and the vertical anti-frictional roller $m$ at the forward end of the land-side of a plow, substantially as and for the purpose set forth and described.

In testimony that I claim the foregoing as my own invention I have affixed my signature in presence of two witnesses.

THOMAS E. JEFFERSON.

Witnesses:
ALBAN ANDRÉN,
HENRY CHADBOURN.